(12) United States Patent
Takahasi et al.

(10) Patent No.: US 7,650,536 B2
(45) Date of Patent: Jan. 19, 2010

(54) FORCED TERMINATION CONDITION MONITORING DEVICE, FORCED TERMINATION CONDITION MONITORING METHOD AND STORAGE MEDIUM EMBODYING FORCED TERMINATION CONDITION MONITORING PROGRAM

(75) Inventors: Kouitirou Takahasi, Kawasaki (JP); Masaki Okuda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 385 days.

(21) Appl. No.: 11/448,055

(22) Filed: Jun. 7, 2006

(65) Prior Publication Data

US 2007/0234119 A1    Oct. 4, 2007

(30) Foreign Application Priority Data

Mar. 29, 2006   (JP) .............................. 2006-090493

(51) Int. Cl.
*G06F 11/00* (2006.01)
(52) U.S. Cl. ........................................................ 714/15
(58) Field of Classification Search .................... 714/15, 714/2, 4, 11, 13, 16, 20, 24, 31, 39, 47
See application file for complete search history.

(56) References Cited

U.S. PATENT DOCUMENTS

| | | | |
|---|---|---|---|
| 6,836,623 B2 * | 12/2004 | Imai .............................. 399/8 |
| 6,920,502 B2 * | 7/2005 | Araujo et al. ................ 709/229 |
| 7,139,939 B2 * | 11/2006 | Greenlee et al. .............. 714/55 |
| 7,209,945 B2 * | 4/2007 | Hicks et al. .................. 709/203 |
| 7,240,234 B2 * | 7/2007 | Morita et al. ................... 714/4 |
| 2003/0223766 A1 | 12/2003 | Imai |

FOREIGN PATENT DOCUMENTS

JP         10-228450          8/1998

* cited by examiner

*Primary Examiner*—Nadeem Iqbal
(74) *Attorney, Agent, or Firm*—Fujitsu Patent Center

(57) ABSTRACT

To terminate startup of an application on an ASP side irrespective of checking on a user side whether or not the application is in the middle of processing. A monitoring device includes means monitoring an operating status of an information processing device for providing a service by starting up an information processing program to a user terminal specified by user identifying information, means judging whether or not the operating status of the information processing device meets a predetermined condition, means terminating the startup of the information processing program if the operating status meets the predetermined condition, and means notifying the user terminal of the termination of the startup of the information processing program.

3 Claims, 5 Drawing Sheets

*FIG. 3*

| JOB ID | SERVER COMPUTER NAME | USER ID | MAXIMUM CPU OPERATING TIME (SEC) | MAXIMUM MEMORY USAGE (MB) |
|---|---|---|---|---|
| 1534 | SERVER-A | A001 | 432000 | 1024 |
| 1535 | SERVER-B | B154 | 0 | 2048 |

FORCED TERMINATION CONDITION MONITORING DEVICE, FORCED TERMINATION CONDITION MONITORING METHOD AND STORAGE MEDIUM EMBODYING FORCED TERMINATION CONDITION MONITORING PROGRAM

BACKGROUND OF THE INVENTION

The present invention relates to a technology of monitoring a forced termination condition.

There is a service for providing functions of applications executed on a computer via a network. This type of service is provided by an enterprise called an ASP (Application Service Provider). There is a case where in the ASP, after starting up the application, the process of the application does not finish as predicted due to defectiveness of input data. There is a method of forcibly terminating the process in such a case by checking on the user side whether or not the application is in the middle of processing.

[Patent document 1] Japanese Patent Application Laid-Open Publication No. 10-228450

[Patent document 2] Japanese Patent Application Laid-Open Publication No. 2004-7467

SUMMARY OF THE INVENTION

The ASP employs a Web Browser included in a client computer of each user. Then, the function of the application executed on the server computer is utilized via the network. Then, in the case of executing the application on the client computer of the user, after terminating the startup of the application, the Web Browser and the client computer are finished. In the case of utilizing the function of the application executed on the server computer via the network, however, such a possibility exists that the Web Browser and the client computer are finished without terminating the startup of the application.

Therefore, the method of checking on the user side whether the application is in the middle of processing or not has a possibility of being unaware, if failing to check, that the process of the application does not finish as predicted.

The ASP normally imposes a charge corresponding to a period of processing time of the application. If the process of the application does not finish as predicted, there is a possibility that an unintended large amount of charge might be imposed on the user. Hence, a problem arises, wherein a degree of user's satisfaction with the service provided by the ASP decreases.

It is an object of the present invention to provide a technology of terminating startup of an application on an ASP side irrespective of checking on a user side whether or not the application is in the middle of processing.

The present invention adopts the following means in order to solve the problems. Namely, a monitoring device of the present invention comprises means monitoring an operating status of an information processing device for providing a service by starting up an information processing program to a user terminal specified by user identifying information, means judging whether or not the operating status of the information processing device meets a predetermined condition, means terminating the startup of the information processing program if the operating status meets the predetermined condition, and means notifying the user terminal of the termination of the startup of the information processing program.

According to the monitoring device of the present invention, if the operating status of the information processing device meets the predetermined condition, regardless of checking on the user side whether the information processing program is in the middle of processing or not, the startup of the information processing program can be terminated. Further, the user can recognize that the startup of the information processing program has been terminated.

Further, the present invention may also be a method by which a computer and other devices, machines, etc execute any one of the processes. Still further, the present invention may also be a program for making the computer and other devices, machines, etc execute any one of the functions. Yet further, the present invention may also be a recording medium recorded with such a program, which can be read by the computer etc.

According to the present invention, it is possible to terminate the startup of the application on the ASP side irrespective of checking on the user side whether the application is in the middle of processing or not.

BRIEF DESCRIPTION OF THE DRAWINGS

FIG. 3 is a diagram showing an example of a structure of a forced termination condition monitoring table 9.

DETAILED DESCRIPTION OF THE INVENTION

An information system according to a best mode (which will hereinafter be termed an embodiment) for carrying out the invention will hereinafter be described with reference to the drawings. A configuration in the following embodiment is an exemplification, and the present invention is not limited to the configuration in the embodiment.

Figure 1:
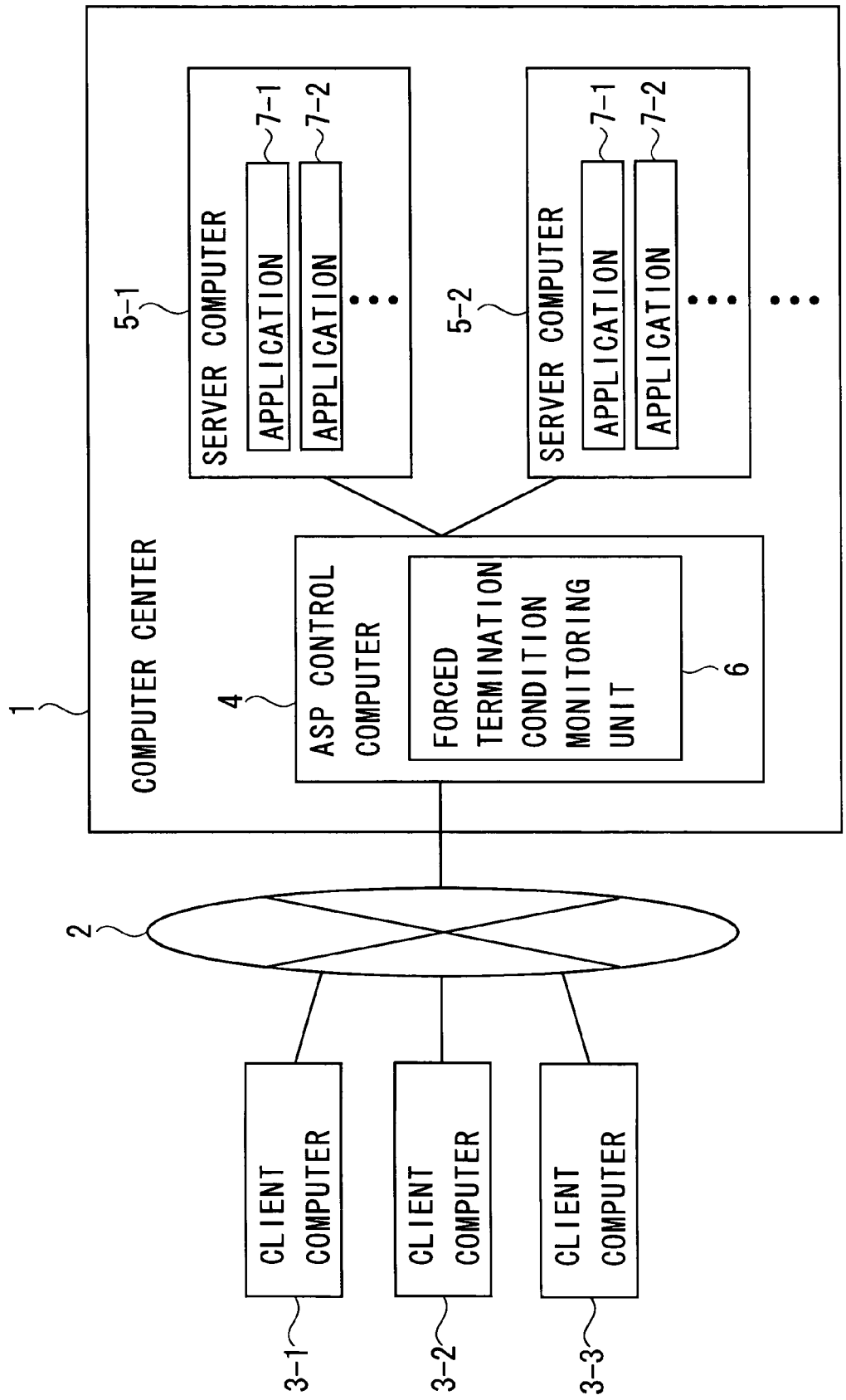
FIG. 1 is a diagram showing a system architecture of the information system.

FIG. 1 is a diagram showing a system architecture of the information system. This information system is configured by a computer center 1 administered by an ASP and client computers 3-1, 3-2, 3-3, etc of users who access the computer center 1 via a network. In the embodiment, the Internet or an Intranet can be used as a network 2. Further, in addition to these networks, the network 2 can be also built up by a communication line such as a telephone line, a carrier leased line, an optical communication network and a communication satellite. Note that the client computers 3-1 etc, when generically termed, are represented by the client computer 3.

The client computer 3 is a computer that includes a CPU (Central Processing Unit), a ROM (Read Only Memory), a RAM (Random Access Memory), an external storage device, a communication interface, a monitor, etc, and is accessible to the network 2. A configuration and an operation of this type of computer are widely known as, e.g., a personal computer, and its explanation is herein omitted.

The client computer 3 has a Web Browser (which will hereinafter also be simply referred to as the Browser). The client computer 3 can access a Web site set up on the network 2 by use of the Browser. The Web site set up on the network 2 is specified by a unique URL (Uniform Resource Locator). The Browser can access the Web site set up on the network 2 by designating the URL.

Further, when inputting a specified URL to the Browser, the Browser can connect to a server configuring the Web site specified by the URL in a way that uses a protocol described in the URL. The URL is structured of a protocol for accessing the information existing on the network 2, a server name on the network 2 where the information exists, a directory stored with the information and a file name.

Moreover, the Browser can receive a desired file described in the URL from the server. The Browser, after receiving the file, decrypts the received file. Then, the Browser displays a screen defined in the file on a monitor of the client computer 3. The file is described in a markup language such as HTML (Hypertext Markup Language) and XML (Extensible Markup Language). Further, the Browser is also capable of transmitting the information inputted by the user to the connected server.

The computer center 1 includes an ASP control computer 4 connected to the network 2, and server computers 5-1, 5-2, etc that provide a variety of functions and a variety of information processing services to the user via the ASP control computer 4. Note that the server computers 5-1 etc, when generically termed, are represented by the server computer 5.

The ASP control computer 4 has a CPU, a ROM, a RAM, an external storage device, a communication interface, etc. Further, the server computer 5 has the CPU, the ROM, the RAM, the external storage device, the communication interface, etc. A configuration and an operation of this type of computer are widely known, and its explanation is herein omitted.

The ASP control computer 4 includes a forced termination condition monitoring unit 6 that monitors whether an operating status of the server computer 5 meets a predetermined condition or not. Moreover, the ASP control computer 4 has an external communication interface connected to the network 2. Still further, the ASP control computer 4 has an internal communication interface connected to the server computer 5.

The server computer 5 has the CPU, the ROM, the RAM, the external storage device, the communication interface, etc. A configuration and an operation of this type of computer are widely known, and its explanation is herein omitted. Further, the server computer 5 includes applications 7-1, 7-2, etc defined as programs for executing the function or the information processing service requested by the user. Note that the applications 7-1 etc, when generically termed, are represented by the application 7.

The ASP control computer 4 has a Web server function. The ASP control computer 4 accepts an access from the user via the network 2. The ASP control computer 4 provides a Web site on the network 2, and accepts the access from the client computer 3 of the user.

On the site set up by the ASP control computer 4, a user ID for identifying the user is set. The user ID corresponds to user identifying information according to the present invention. Further, on the site set up by the ASP control computer 4, designation of the function or the information processing service requested by the user is accepted from the user. Then, the ASP control computer 4 makes the server computer 5 execute the application corresponding to the function or the information processing service requested by the user. Then, the ASP control computer 4 transmits a result of the execution by the server computer 5 to the client computer 3 of the user.

Figure 2:
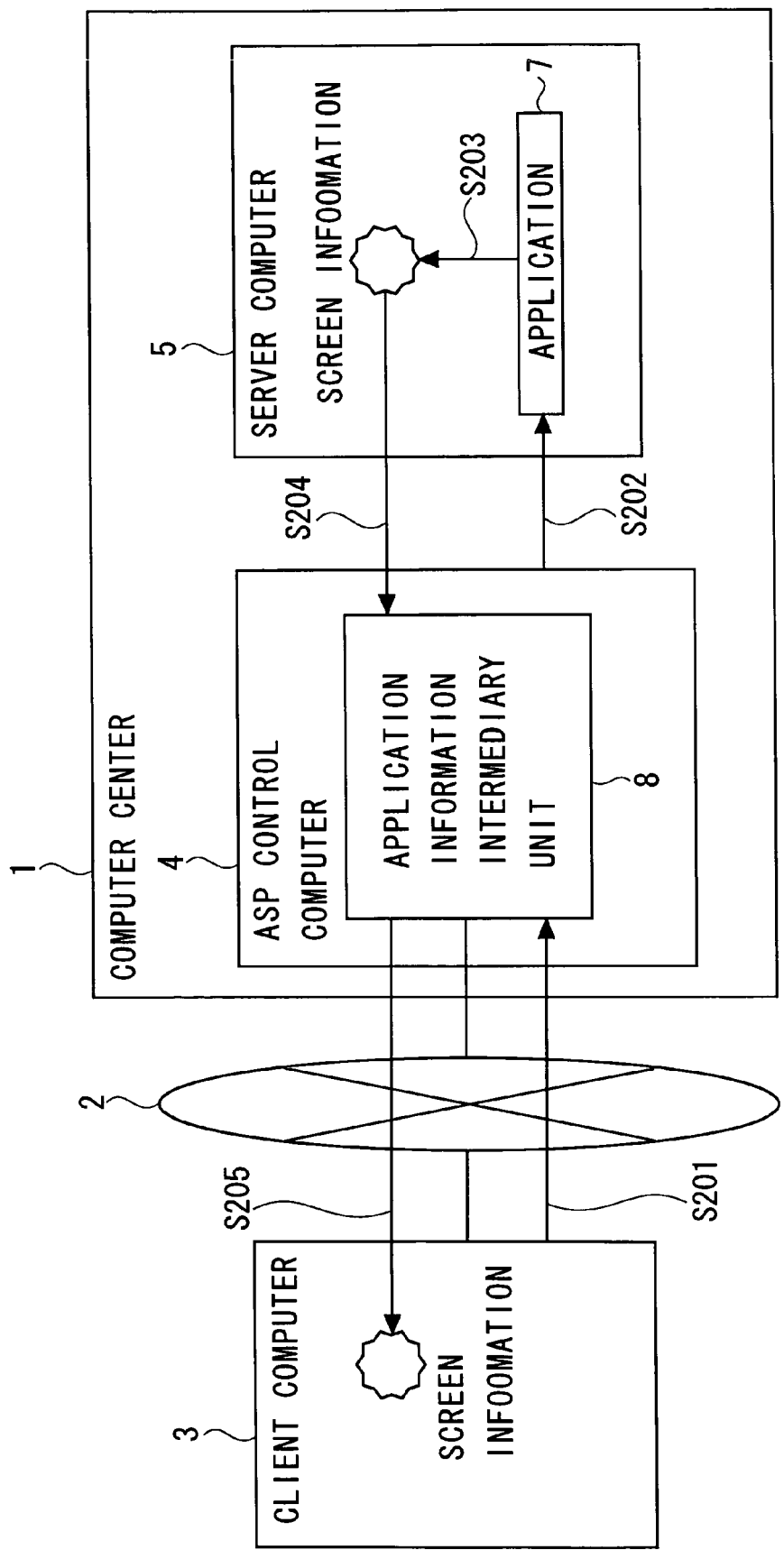
FIG. 2 is a diagram showing a flow in which an ASP control computer 4 and a server computer 5 provide a function or an information processing service requested by a user.

FIG. 2 is a diagram showing a flow in which the ASP control computer 4 and the server computer 5 provide the function or the information processing service requested by the user. To begin with, the ASP control computer 4 accepts the function or the information processing service requested by the user via the network 2 (S201). Specifically, the function or the information processing service requested by the user is accepted by an application information intermediary unit 8 included in the ASP control computer 4.

Then, the ASP control computer 4 makes the server computer 5 execute the application corresponding to the function or the information processing service requested by the user (S202). Next, the server computer 5 outputs a result of executing the application corresponding to the function or the information processing service requested by the user (S203). For example, the server computer 5 outputs screen information defined as the result of executing the application corresponding to the function or the information processing service requested by the user.

Further, the result of executing the application is transmitted to the ASP control computer 4 (S204). For instance, the screen information defined as the result of executing the application corresponding to the function or the information processing service requested by the user, is received by the application information intermediary unit 8 included in the ASP control computer 4.

Next, the result of executing the application is transmitted via the network 2 to the client computer 3 of the user (S205). Then, for example, the screen information defined as the result of executing the application corresponding to the function or the information processing service requested by the user, is displayed on the monitor by the Browser included in the client computer 3.

The server computer 5 executes the application on the basis of an instruction of the ASP control computer 4. Then, the server computer 5 provides the function or the information processing service requested by the user via the ASP control computer 4 to the user.

The ASP control computer 4 has a forced termination condition monitoring table 9 in which to set conditions for forcibly terminating startup of the application corresponding to the function or the information processing service requested by the user. FIG. 3 shows an example of a structure of the forced termination condition monitoring table 9. The forced termination condition monitoring table 9 has respective fields such as a "job ID" field, a "server computer name" field, a "user ID" field, a "maximum CPU operating time" field and a "maximum memory usage" field. It is to be noted that the forced termination condition monitoring table 9 is stored in, e.g., the ROM, the external storage device, etc included in the ASP control computer 4.

The job ID is a serial number assigned to every process (the process of the application corresponding to the function or the information processing service requested by the user will hereinafter be referred to as a [job].) of the application corresponding to the function or the information processing service requested by the user. The server computer name is information for identifying the server computer 5 having the application that executes the job. The user ID is a number for identifying the user provided with the function or the information processing service of the application that executes the job.

The maximum CPU operating time is CPU operating time of the server computer 5, wherein a condition for forcibly terminating the startup of the application that executes the job is set. An arbitrary value can be set in this maximum CPU operating time. Note that if "0" is set as the value of the maximum CPU operating time in the forced termination condition monitoring table 9, this represents non-designation of the condition for forcibly terminating the server computer 5. Namely, if "0" is set as the value of the maximum CPU operating time in the forced termination condition monitoring table 9, the CPU operating time of the server computer 5 does not become the condition for forcibly terminating the startup of the application that executes the job.

The maximum memory usage is a memory usage of the server computer 5, wherein a condition for forcibly terminating the startup of the application that executes the job is set. An arbitrary value can be set in this maximum memory usage. Note that if "0" is set as the value of the maximum memory usage in the forced termination condition monitoring table 9, this represents non-designation of the condition for forcibly terminating the server computer 5. Namely, if "0" is set as the value of the maximum memory usage in the forced termination condition monitoring table 9, the memory usage of the server computer 5 does not become the condition for forcibly terminating the startup of the application that executes the job.

Figure 4:
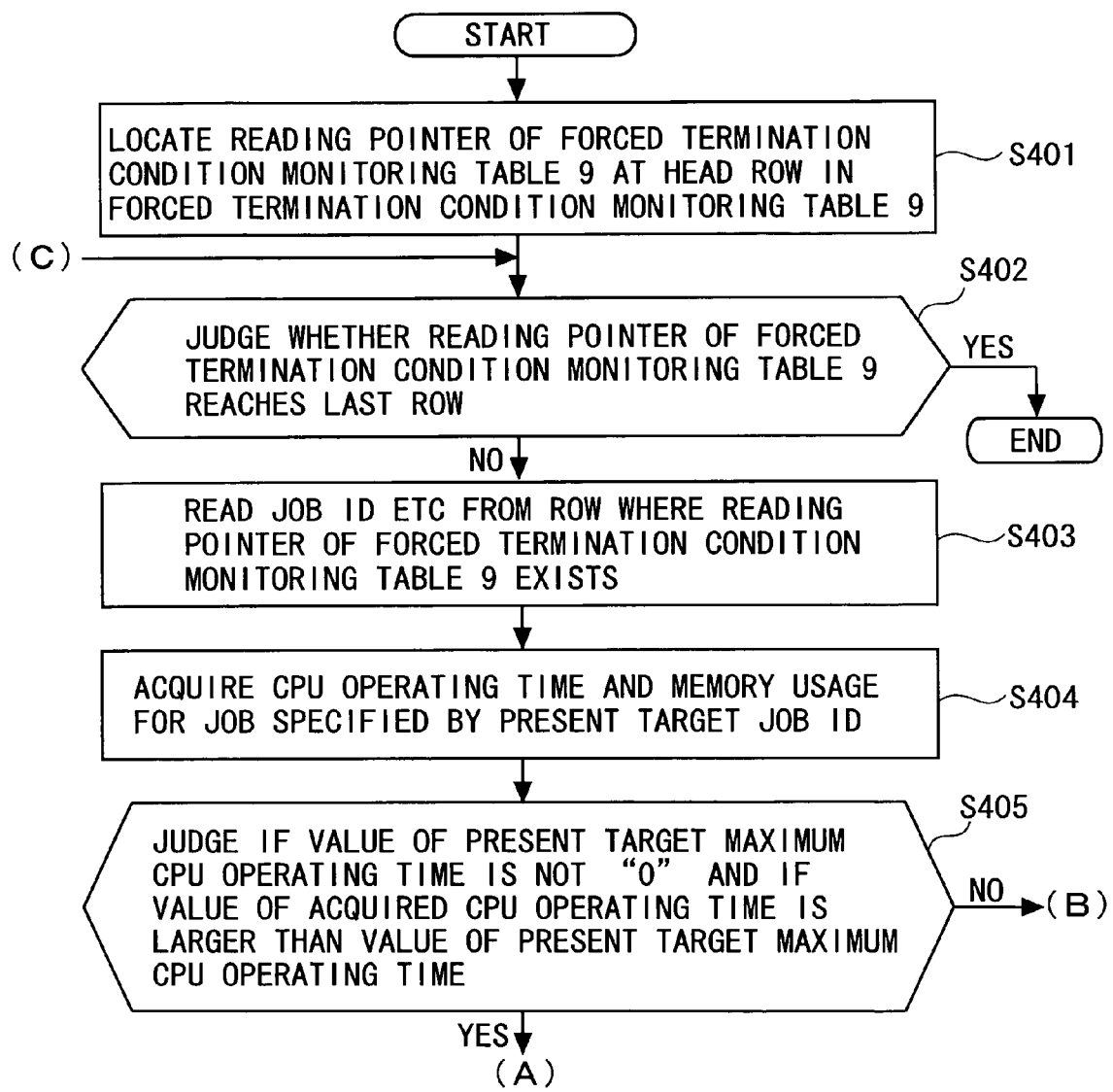
FIG. 4 is a flowchart showing a forced termination process in the ASP control computer 4.
Figure 5:
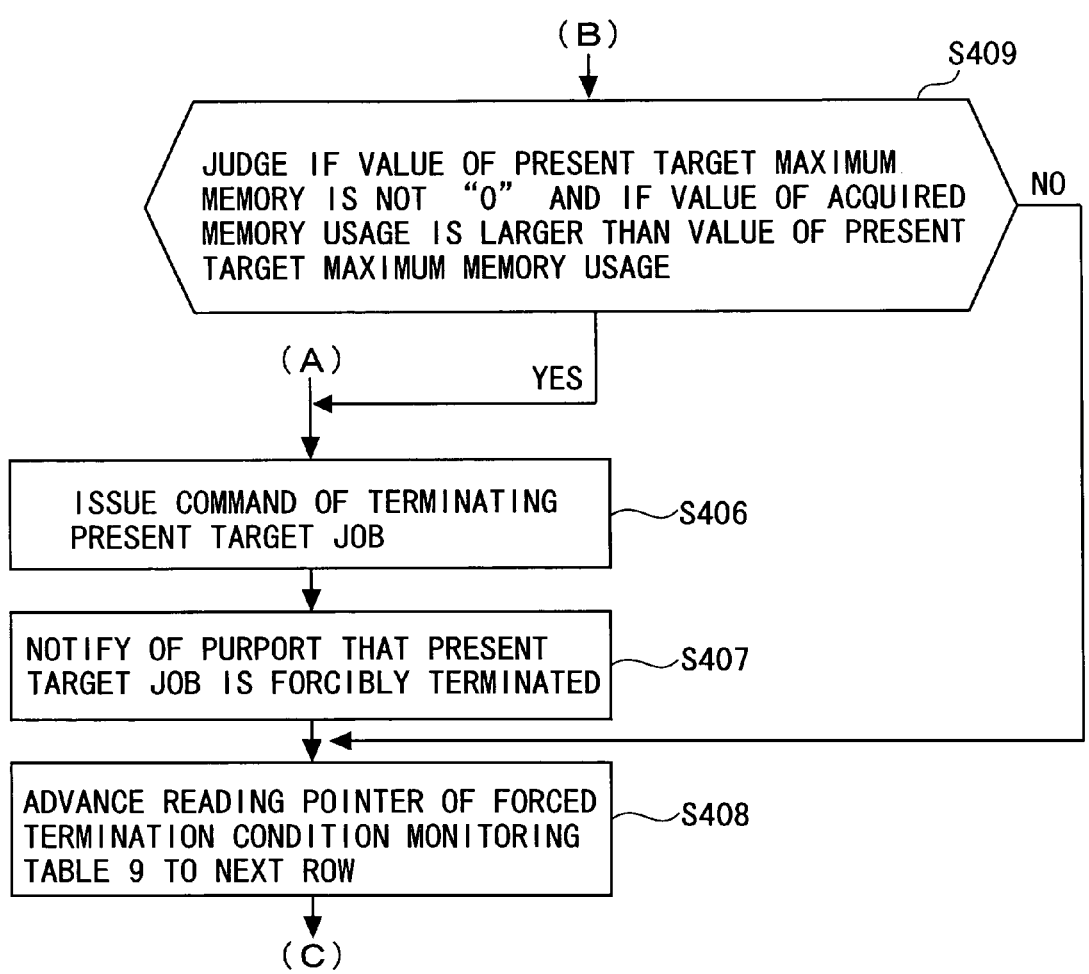
FIG. 5 is a flowchart showing the forced termination process in the ASP control computer 4.

FIGS. 4 and 5 show flowcharts of the forced termination process in the ASP control computer 4. This forced termination process is actualized in a way that the ASP control computer 4 executes the program.

In this process, to start with, the ASP control computer 4 locates a reading pointer of the forced termination condition monitoring table 9 at a head row (the not-yet-processed head row where the forced termination process is not yet executed) of the forced termination condition monitoring table 9 (S401 in FIG. 4).

Next, the ASP control computer 4 judges whether or not the reading pointer of the forced termination condition monitoring table 9 reaches the last row (S402 in FIG. 4). When the reading pointer reaches the last row, the ASP control computer 4 finishes the forced termination process.

While on the other hand, when reading pointer does not yet reach the last row, the ASP control computer 4 reads the job ID, the server computer name, the user ID, the maximum CPU operating time and the maximum memory usage (S403 in FIG. 4) from the row at which the reading pointer of the forced termination condition monitoring table 9 is located. The job ID, the server computer name, the user ID, the maximum CPU operating time and the maximum memory usage, which have been thus read, are referred to as a present target job ID, a present target server computer name, a present target user ID, a present target maximum CPU operating time and a present target maximum memory usage, respectively.

Next, the ASP control computer 4 acquires the CPU operating time and the memory usage for the job specified by the present target job ID (the job specified by the present target job ID will hereinafter be called a [present target job]) from the server computer 5 identified by the present target server computer name (S404 in FIG. 4).

Then, the ASP control computer 4 judges if the value of the present target maximum CPU operating time is not "0" and if the value of the acquired CPU operating time is larger than the value of the present target maximum CPU operating time (S405 in FIG. 4).

If the value of the present target maximum CPU operating time is not "0" and if the value of the acquired CPU operating time is larger than the value of the present target maximum CPU operating time, the ASP control computer 4 advances the control to S406 in FIG. 5 (see FIG. 4(A) and FIG. 5).

Then, the ASP control computer 4 issues a command of terminating the present target job to the server computer 5 identified by the present target server computer name (S406 in FIG. 5).

Next, the ASP control computer 4 notifies the client computer 3 of the user identified by the present target user ID, of such a purport that the present target job has been forcibly terminated (S407 in FIG. 5). A method of notifying of the purport that the present target job has been forcibly terminated involves sending the notification purporting that the present target job has been forcibly terminated to a mail address held by the user identified by the present target user ID. In this case, the client computer 3 of the user identified by the present target user ID receives, via the network 2, the notification purporting that the present target job has been forcibly terminated.

Then, the ASP control computer 4 advances the reading pointer of the forced termination condition monitoring table 9 to a next row (S408 in FIG. 5). Then, the ASP control computer 4 loops the control back to S402 in FIG. 4 (see FIG. 4 and FIG. 5(C)).

Whereas if the value of the present target maximum CPU operating time is "0" and if the value of the acquired CPU operating time is not larger than the value of the present target maximum CPU operating time (if judged to be negated in the process in S405 in FIG. 4), the ASP control computer 4 advances the control to S409 in FIG. 5 (see FIG. 4(B) and FIG. 5).

Then, the ASP control computer 4 judges if the value of the present target maximum memory usage is not "0" and if the value of the acquired memory usage is larger than the value of the present target maximum memory usage (S409 in FIG. 5).

If the value of the present target maximum memory usage is not "0" and if the value of the acquired memory usage is larger than the value of the present target maximum memory usage, THE ASP control computer 4 advances the control to S406 in FIG. 5.

Whereas if the value of the present target maximum memory usage is "0" and if the value of the acquired memory usage is not larger than the value of the present target maximum memory usage, the ASP control computer 4 advances the control to S408 in FIG. 5.

The ASP control computer 4 executing respective steps S401, S402, S403, S404 in FIG. 4 and S408 in FIG. 5 corresponds to a monitoring means according to the present invention. More specifically, the forced termination condition monitoring unit 6 included in the ASP control computer 4 takes charge of the execution thereof.

Further, the ASP control computer 4 executing respective steps S405 in FIG. 4 and S409 in FIG. 5 explained above corresponds to a judging means according to the present invention. Still further, the ASP control computer 4 executing step S406 in FIG. 5 explained above corresponds to a means terminating startup of an information processing program according to the present invention. Yet further, the ASP control computer 4 executing step S407 in FIG. 5 explained above corresponds to a means notifying a user terminal according to the present invention.

Thus, the ASP control computer 4 issues the command of terminating the present target job to the server computer 5 identified by the present target server computer name. Then, the server computer 5 receiving the command of terminating the present target job finishes the startup of the application executing the present target job. As a result, even when the process of the application is not finished as predicted, it is possible to eliminate a possibility that an unintended large amount of charge might be imposed on the user.

Further, even if it is not checked on the user side whether the application is in the middle of processing or not, the ASP control computer 4 can terminate the startup of the application. Moreover, the user receiving the notification that the startup of the application has been forcibly terminated, and can therefore confirm that the unintended large amount of charge does not occur even when the process of the application is not finished as predicted.

MODIFIED EXAMPLE

The embodiment has exemplified the example in which the forced termination condition monitoring table 9 has the respective fields such as the "job ID" field, the "server computer name" field, the "user ID" field, the "maximum CPU operating time" field and the "maximum memory usage" field. The forced termination condition monitoring table 9 according to the present invention is not limited to having these fields. For example, a "maximum processing time" field, a "maximum disc usage" field and a "maximum disc residual quantity" field may also be added as the fields of the forced termination condition monitoring table 9.

<Computer Readable Recording Medium>

It is possible to record a program which causes a computer to implement any of the functions described above on a computer readable recording medium. By causing the computer to read in the program from the recording medium and execute it, the function thereof can be provided. The computer readable recording medium mentioned herein indicates a recording medium which stores information such as data and a program by an electric, magnetic, optical, mechanical, or chemical operation and allows the stored information to be read from the computer. Of such recording media, those detachable from the computer include, e.g., a flexible disk, a magneto-optical disk, a CD-ROM, a CD-R/W, a DVD, a DAT, an 8-mm tape, and a memory card. Of such recording media, those fixed to the computer include a hard disk and a ROM (Read Only Memory).

<Others>

The disclosures of Japanese patent application No. JP2006-090493 filed on Mar. 29, 2006 including the specification, drawings and abstract are incorporated herein by reference.

What is claimed is:

1. A monitoring device comprising:
  a monitoring unit to monitor an operating status of an information processing device for providing a service by starting up an information processing program for a user terminal specified by user identifying information;
  a table to store termination conditions of the startup of the information processing program corresponding to each of the user identifying information;
  a judging unit to judge whether or not the operating status of the information processing device meets one of the termination conditions;
  a terminating unit to terminate the startup of the information processing program if the operating status meets one of the termination conditions; and
  a notifying unit to notify the user terminal of the termination of the startup of the information processing program.

2. A monitoring method executed by a computer, comprising:
  monitoring an operating status of an information processing device for providing a service by starting up an information processing program for a user terminal specified by user identifying information;
  referring to a table storing termination conditions of the startup of the information processing program corresponding to each of the user identifying information;
  judging whether or not the operating status of the information processing device meets one of the termination conditions;
  terminating the startup of the information processing program if the operating status meets one of the termination conditions; and
  notifying the user terminal of the termination of the startup of the information processing program.

3. A computer-readable storage medium storing a monitoring program of executable instructions, which when executed by a computer cause the computer to perform a method, the method, comprising:
  monitoring an operating status of an information processing device for providing a service by starting up an information processing program for a user terminal specified by user identifying information;
  referring to a table storing termination conditions of the startup of the information processing program corresponding to each of the user identifying information;
  judging whether or not the operating status of the information processing device meets one of the termination conditions;
  terminating the startup of the information processing program if the operating status meets one of the termination conditions; and
  notifying the user terminal of the termination of the startup of the information processing program.

* * * * *